(12) United States Patent
Tompkin et al.

(10) Patent No.: US 7,078,090 B2
(45) Date of Patent: Jul. 18, 2006

(54) DECORATIVE FOIL

(75) Inventors: Wayne Robert Tompkin, Baden (CH); René Staub, Hagendorn (CH)

(73) Assignee: OVD Kinegram AG, Zug (CH)

( * ) Notice: Subject to any disclaimer, the term of this patent is extended or adjusted under 35 U.S.C. 154(b) by 0 days.

(21) Appl. No.: 10/450,546

(22) PCT Filed: Dec. 18, 2001

(86) PCT No.: PCT/EP01/14970

§ 371 (c)(1),
(2), (4) Date: Jun. 13, 2003

(87) PCT Pub. No.: WO02/051646

PCT Pub. Date: Jul. 4, 2002

(65) Prior Publication Data

US 2004/0076802 A1    Apr. 22, 2004

(30) Foreign Application Priority Data

Dec. 22, 2000   (DE) .............................. 100 64 616

(51) Int. Cl.
*B32B 3/10* (2006.01)

(52) U.S. Cl. ............... 428/209; 428/141; 428/156; 428/195.1; 428/203; 428/204; 428/208; 428/916; 283/86; 283/91; 283/94; 283/72; 283/83; 283/107; 283/109; 283/111; 359/2; 359/584; 359/589; 359/585

(58) Field of Classification Search ............... 428/141, 428/156, 195.1, 203, 204, 208, 209, 916; 283/86, 91, 94, 72, 83, 107, 109, 111; 359/2, 359/584, 585, 589
See application file for complete search history.

(56) References Cited

U.S. PATENT DOCUMENTS 2,590,906 A    4/1952    Tripp
(Continued)

FOREIGN PATENT DOCUMENTS

| DE | 39 32 505 A1 | 4/1991 |
| DE | 197 44 953 A1 | 4/1999 |
| EP | 0 181 770 A2 | 5/1986 |
| EP | 0 201 323 B1 | 11/1986 |

(Continued)

OTHER PUBLICATIONS

Hospel, W., "Application of Laser Technology to Introduce Security Features on Security Documents in Order to Reduce Counterfeiting," *SPIE*, vol. 3314, pp. 254-259.
Brongers, J.D., "Search for Effective Document Security by 'Inventioneering'," *SPIE*, vol. 3314, pp. 29-39.

*Primary Examiner*—William P. Watkins, III
(74) *Attorney, Agent, or Firm*—Hoffmann & Baron, LLP

(57) ABSTRACT

A decorative foil is in the form of a layer composite structure (1) and comprises at least a transparent base foil (2), a transparent cover layer (4) and a transparent dielectric layer (3) arranged between the base foil (2) and the cover layer (4). When the decorative foil serves as a lamination foil for a substrate (5) the material of the cover layer (4) is an adhesive. A reflective metallic layer (6) is arranged at least in surface portions between the dielectric layer (3) and the cover layer (4) and optionally a metal film (11) is also arranged on the side of the dielectric layer (3) facing the base foil (2). General items of information shown by the decorative foil are produced by means of modulation of the thickness (s) of the dielectric layer (3). Transparent locations (7) form individual items of information, wherein the transparent locations (7) are produced with a laser beam (19) by perforating the metal layer (6; 11). Besides being used as a lamination foil the decorative foil can also be used as a packaging foil.

13 Claims, 2 Drawing Sheets

U.S. PATENT DOCUMENTS

| | | | |
|---|---|---|---|
| 3,338,730 A | 8/1967 | Slade et al. | |
| 3,858,977 A | 1/1975 | Baird et al. | |
| 4,662,653 A | 5/1987 | Greenaway | |
| 4,856,857 A * | 8/1989 | Takeuchi et al. | 359/3 |
| 4,930,866 A | 6/1990 | Berning et al. | |
| 5,331,443 A | 7/1994 | Stanisci | |
| 5,377,045 A | 12/1994 | Wolfe et al. | |
| 5,815,292 A * | 9/1998 | Walters | 359/2 |
| 6,010,751 A | 1/2000 | Shaw et al. | |
| 6,082,778 A * | 7/2000 | Solmsdorf | 283/82 |
| 6,294,241 B1 * | 9/2001 | Kaule et al. | 428/138 |
| 6,337,752 B1 * | 1/2002 | Heckenkamp et al. | 359/2 |
| 6,382,677 B1 * | 5/2002 | Kaule et al. | 283/107 |
| 6,452,698 B1 * | 9/2002 | Vlcek et al. | 359/3 |
| 6,739,627 B1 * | 5/2004 | Cobben et al. | 283/91 |
| 6,761,959 B1 * | 7/2004 | Bonkowski et al. | 428/156 |

FOREIGN PATENT DOCUMENTS

| | | |
|---|---|---|
| EP | 0 165 021 A2 | 12/1995 |
| EP | 0 956 975 A2 | 11/1999 |
| JP | 61 019350 | 1/1986 |
| JP | 03 129303 | 6/1991 |
| JP | 296698 | 10/2000 |
| WO | WO 98/19869 | 5/1998 |
| WO | WO 99/47983 | 9/1999 |

* cited by examiner

DECORATIVE FOIL

This application claims priority based on an International Application filed under the Patent Cooperation Treaty, PCT/EP01/14970, filed on Dec. 18, 2001, and German Patent Application No. 100 64 616.6, filed on Dec. 20, 2000.

BACKGROUND OF THE INVENTION

The invention relates to a decorative foil and a method of marking the decorative foil.

Such decorative foils are used for safeguarding and protecting markings and inscriptions, photographs and other indicia on documents such as passes, identity cards, credit cards, banknotes etc, or for packaging valuable articles.

U.S. Pat. No. 5,331,443 describes a method in which a freshly embossed and light-diffracting relief structure covered by a reflection layer can be individualised by applying marking thereto. The reflection layer is locally removed by means of laser beams and then covered with an adhesive layer. The disadvantage of this method is that the individual marking has to be applied prior to finishing of the layer composite structure by application of the adhesive layer.

It is also known (U.S. Pat. No. 2,590,906) that a dielectric coated with a metal forms an interference filter which in daylight reflects brilliant interference colors. U.S. Pat. No. 3,858,977 describes the suitability of multi-layer interference filters as an authenticity feature for documents. In accordance with U.S. Pat. No. 3,338,730 structured surfaces which do not diffract daylight are covered with such interference filters in order to obtain an attractive packaging material which lights up in the interference colors.

WO 98/19869 describes a method of perforating documents by means of focussed laser light. The density of the holes produced in the document and the diameter of the holes are determined by a pattern of an original. For that purpose an optical sensor senses the original and converts the recognised gray tones of the original into density and diameter of the holes which are burnt in the document. In that way it is possible to produce images, portraits or letter images which can be seen when looking through the document and which are practically impossible to counterfeit. Uses of that method are described in the article entitled 'Application of laser technology to introduce security features on security documents in order to reduce counterfeiting' by W Hospel in Proceedings of SPIE, Vol 3314, 28–30 Jan., 1998, pages 254–259.

The article 'Search for effective document security by "inventioneering"' by J D Brongers in Proceedings of SPIE, Vol 3314, January, 1998, pages 29–38 describes that intensive, finely focussed laser light is used to remove color layers on the surface of a substrate in a predetermined pattern from a print image without damaging the substrate itself.

EP 0 201 323 B1 describes the layer structure of plastic foils which include embossed holograms with transparent reflection layers. The materials suitable for the layer structure and the reflection layer are summarised in that document.

Transparent dielectrics with a very high refractive index for increasing the reflection capability in respect of diffraction structures are known from WO 99/47983.

SUMMARY OF THE INVENTION

The object of the invention is to provide an inexpensive decorative foil which is suitable for marking and for lamination on to a document or packaging, and a method for introducing items of information into the decorative foil.

In accordance with the invention the specified object is attained by the features recited in the characterising portions of claims 1 and 15. Advantageous configurations of the invention are set forth in the appendant claims.

BRIEF DESCRIPTION OF THE DRAWINGS

Embodiments of the invention are described in greater detail hereinafter and illustrated in the drawing in which.

DESCRIPTION OF THE PREFERRED EMBODIMENTS

Figure 1:
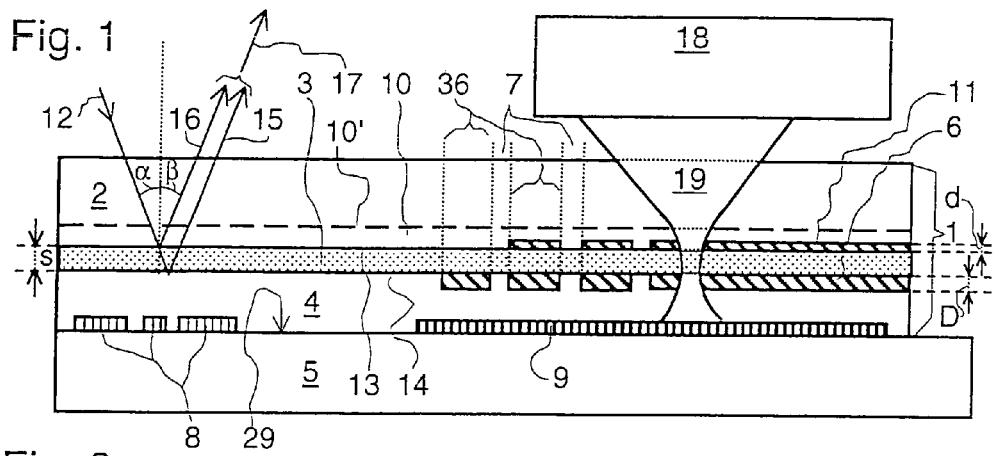
FIG. 1 is a view in cross-section of a decorative foil on a substrate.

In FIG. 1 reference numeral 1 denotes a layer composite structure for a decorative foil, reference 2 denotes a base foil, reference 3 denotes a dielectric layer, reference 4 denotes a cover layer, reference 5 denotes a substrate, reference 6 denotes a metallic layer, reference 7 denotes a transparent location without a metallic layer 6 while reference 8 denotes indicia and reference 9 a color area on the substrate 5. The substrate 5 is at least part of a document such as a banknote, personal identity pass, pass, identity card, credit card and so forth.

The layer composite structure 1 is built up on a transparent base foil 2. In a simple embodiment of the layer composite structure 1 the inward side of the base foil 2 is completely covered with a thin layer 3 of a transparent dielectric. Then, at least in partial regions, the dielectric layer 3 is followed by a reflective metallic layer 6. The metallic layer 6 can be applied directly only in the partial regions or initially over the full surface area involved, in which case then the metallic layer 6 is removed again outside the partial regions. The layer composite structure 1 is finished as a decorative foil by covering over the dielectric layer 3 and the metallic layer 6 respectively with the cover layer 4.

If the decorative layer is intended to be laminated on to a substrate 5 the material of the cover layer 4 has adhesiveness. The layer composite structure 1 is brought into contact with the cover layer 4 with the substrate 5 and joined to the substrate 5 by activation of the adhesive of the cover layer 4. For example the cover layer 4 comprises a hot melt adhesive whose adhesiveness is only developed by heating the layer composite structure 1 and the substrate 5 to a temperature of over 100° C. Such hot melt adhesives are available on a polyurethane or polyethylene base. In another embodiment of the layer composite structure 1 the material of the cover layer 4 is a cold adhesive which is activated by pressing the layer composite structure 1 against the substrate 5. The use of a cold adhesive means that the free surface of the cover layer 4 is to be covered with a pull-off foil (not shown here) immediately after application of the cold adhesive. The pull-off foil has to be removed before the layer composite structure 1 is stuck on to the substrate 5. Materials which can be used for the cover layer 4 are mentioned in EP 0 201 323 B1 in the section entitled 'adhesive layer' on page 13.

In an embodiment hot-laminatable decorative foils, between a lacquer layer 10 and the base foil 2, advantageously have a separation layer 10' which is indicated in FIG. 1 by a broken line and which is between about 500 nm and 1 μm in thickness so that, after the decorative foil has been laminated on the substrate 5, the base foil 2 can be pulled off. The part of the layer composite structure 1 which remains on the substrate 5 is less than 20 μm thick.

In another embodiment, the layer composite structure 1 additionally includes a transparent metal film 11 between the base foil 2 or the lacquer layer 10 and the dielectric layer 3. The metal film 11 covers over the first boundary layer 13 in such a way that the dielectric layer 3 is embedded between the metal film 11 and the metallic layer 6.

The base foil 2, on the side towards the dielectric, can have a transparent lacquer layer 10 in order to achieve better adhesion for the dielectric and/or easier mechanical deformability of the surface of the base foil 2, which is towards the dielectric, when the lacquer layer 10 is better suited for shaping a microscopically fine relief of a surface pattern, than the base foil 2. The surface pattern includes a mosaic-like arrangement of diffraction elements and other surface elements with scattering or reflecting properties or it is a hologram. The lacquer layer 10 is applied at least approximately twice as thick as the profile height of the microscopically fine relief of the surface pattern; the thickness of the lacquer layer 10 is in the range of between 150 nm and 2 μm. The operation of shaping the relief can be effected prior to or after the step of applying the dielectric layer 3 or also only into the metallic layer 6.

Transparent material is optically clear and transmits the entire spectrum of visible light (=material which is as clear as glass) or only certain spectral regions thereof (=colored material).

Foil webs of polyvinyl chloride (PVC), polycarbonate (PC), polyethylene teraphthalate (PETP), polyethylene (PE), polypropylene (PP), cellophane or a foil of another transparent plastic material, which are commercially available in widths of between about 30 cm and 120 cm, are suitable as the base foil 2. What is common to those foils are their high level of transparency and their great tensile strength even in small layer thicknesses. Typically the layer thicknesses of those foils, depending on the foil material, are in the range of between 200 μm and less than 9 μm. The refractive index $n_d$ of those materials is in the range of values of between 1.50 and 1.60 or directly adjacent to that range by a few tenths. Good adhesion between the base foil 2 and the other layers of the layer composite structure 1 is essential.

The lacquer layer 10 is applied on the base foil 2 in the form of a low-viscosity lacquer. Examples of various transparent lacquers are referred to in above-mentioned EP 0 201 323 B1, page 5, section entitled 'Transparent hologram forming layer', as well as solvent-bearing and also solvent-free lacquer, for example hardening by means of ultraviolet light. A composition for a lacquer with solvent for the thermoplastic lacquer layer 10 is set out at line 15 on page 19 of EP 0 201 323 B1.

In an embodiment the dielectric layer 3 involves a substantially uniform application of a thickness s, wherein the thickness s is at most 300 nm, but typical values are between 50 nm and 200 nm. Suitable dielectrics which are transparent, in the visible part of the spectrum of electromagnetic waves are referred to in Table 1 of above-mentioned EP 0 201 323 B1. The selected dielectric is applied in a vacuum by means of vapor deposition or sputtering to the base foil 2 or the lacquer layer 10 respectively. Preferred transparent dielectrics are $MgF_2$, ZnO, SiO, $SiO_2$, $TiO_2$ and ZnS as well as the chalcogenide substances which are known from WO 99/47983 and which are distinguished by a very high refractive index, such as $Ge_{30}Sb_{10}S_{60}$ (n=2.25), $As_{50}Ge_{20}Se_{30}$ (n=2.95), and $Ge_{20}Sb_{25}Se_{55}$ (n=3.11). White light which penetrates through the base foil 2 into the layer composite structure 1 at an angle of incidence a is partially reflected at a first interface 13 between the base foil 2 or the lacquer layer 10 and the metal film 11 or the dielectric layer 3 and at a second interface 14 between the dielectric layer 3 and the metallic layer 6 or the cover layer 4, in which case the degree of reflection is determined by the jump in the refractive index in the transition at each interface 13, 14 and the angle of incidence α. Light beams 15 which have penetrated into the dielectric layer 3 and which were reflected at the second interface 14 cover a greater distance than light waves 16 which were already reflected at the first interface 13. The light beams 15 and the light beams 16 involve a phase difference, by virtue of the difference in the distance covered, and in that respect as a consequence of interference effects a reflected light 17 is produced from the light beams 15 and the light waves 16, in respect of which light certain wavelength ranges are extinguished from the spectrum of the white light 12. Therefore in daylight the decorative foil shines in an interference color which is dependent on the thickness of the dielectric layer 3 and the reflection angle β, that is to say α=β. The intensity of the interference color of the reflected light 17 is increased if the metallic layer 6 and/or the metal film 11 is present.

In a further embodiment, instead of those transparent dielectrics, the dielectric layer 3 comprises one of the lacquers referred to for the lacquer layer 10. As the refractive indices of the materials for the base foil 2 and the lacquer layer 10 respectively and for the cover layer 4 differ only very slightly from the dielectric layer 3, the intensity of the interference colors is low. The dielectric layer 3 is therefore preferably disposed between the metal film 11 and the metallic layer 6.

In another embodiment of the layer composite structure 1 instead of the adhesive, the same material is applied for the cover 4 as for the lacquer layer 10. Such a foil can be used as a packaging foil for exclusive articles and gifts. The decorative foils provided with a hot melt adhesive can also be used for packaging. Therefore 'decorative foil' denotes both a decorative lamination foil and also a decorative packaging foil.

The microscopically fine relief of the optically diffractive surface pattern, which relief is optionally formed in the lacquer layer 10, diffracts at the first and second interfaces 13 and 14 the incident light at the wavelength λ at the diffraction angles γ determined by the wavelength λ and the respective grating parameters such as grating vector, relief profile, spatial frequency f, azimuth and so forth. The light diffracted at the first interface 13 involves a difference in the distance covered, in comparison with the light diffracted at the second interface 14. Because of the interference effects the light diffracted at the diffraction angle γ in the m-th order, of the wavelength λ can be extinguished so that parts of the surface pattern, instead of appearing in brilliant colors, appear in a mixed color or indeed gray to black. If the grating vector is in the plane of the light 12 incident at the angle α, the diffraction angle γ is determined by the relationship $\gamma = \pm \arcsin[m \cdot f \cdot \lambda + \sin(\alpha)]$. To simplify the view in FIG. 1 changes in direction of the light beams 12, 15, 16, as a consequence of refraction effects, are not shown.

The metallic layer 6 and the metal film 11 comprise a metal from the preferred group: aluminum, silver, gold, chromium, copper and tellurium. Those metals are suitable for vapor deposition of the metallic layer 6 or the metal film 11 and are chemically insensitive in the layer composite structure 1. The metallic layer 6 is intended to reflect a large part of the incident light beams 12. Therefore the thickness D of the metallic layer 6 is more than 50 nm, preferably between 50 nm and 300 nm. In contrast thereto the metal film 11 must be transparent for a large part of the incident light 12; therefore the metal film is of a layer thickness d of a value of 50 nm or less; a typical range for the layer thickness d is between 5 nm and 15 nm. The layer thicknesses D and d are dependent on the metal and the wavelength $\lambda$ of the incident light 12 and 15 respectively, as is set forth in 'Optical properties of thin solid films' by O S Heavens, Butterworths Scientific Publications, London (1955), pages 156–170. In a particular configuration the thickness D (FIG. 1) of the metallic layer 6 is also so slight that the metallic layer 6 is as transparent as the metal film 11. The reflectivity in the layer composite structure 1 is higher than in the case of the layer composite structure 1 without metal layers 6, 11 but lower than in the case of the decorative foil with a completely reflective metal layer 6. The layer composite structure 1 is therefore colored transparent over its entire surface area and reflects colored light 17.

A writing device 18 includes a pulsed light source, for example a laser, light emitting diode and so forth, with a focusing device of short focal length. A high-power energy beam 19 which is briefly emitted by the light source is focussed by means of the focusing device through the base foil 2 into the layer composite structure 1 in such a way that the focus of the energy beam 19 and thus the highest power density is in the region of the metallic layer 6. The power density decreases rapidly outside the focus on an axis of the energy beam 19. The thin metallic layer 6 and a metal film 11 if present are locally rapidly heated above the melting point of the metal. When they cool down the metal at the interfaces 13, 14 hardens to form very fine globules which are not visible to the eye. The energy beam 19 perforates only the metal layers 6, 11 but not the other layers of the layer composite structure 1 so that the layer composite structure 1 has the transparent location 7 at the perforation. In the focus the diameter of the energy beam 19 is typically some 10 µm. The pulse duration and the delivered power of the energy beam 19 determine the diameter of the transparent location 7 produced with a pulse. A plurality of pulses of the energy beam 19, applied to immediately juxtaposed locations, produce the round transparent location 7 of a size of up to 1 mm or a transparent location 7 in the form of a line which is up to 1 mm in width. The pulse duration, the power and the wavelength of the energy beam 19 are to be so selected that the energy beam 19 on the one hand deposits as little energy as possible in the dielectric layer 3, in the plastic layers 2, 4 and 10 and in the indicia 8 or the color area 9, so that the heating effect thereof is kept within limits and no damage to the layer composite structure 1 or the substrate 5 occurs, and on the other hand it is strongly absorbed by the metal of the layers 6, 11. The foil webs with the layer structure 1 can be written or engraved with that device in the surface portions with the metallic layer 6. For that purpose, on a rolling transfer apparatus, the foil webs are unrolled from one winding and then rolled on to the other winding again. During the rolling transfer operation from one winding to the other, the foil web is pulled through beneath the computer-controlled energy beam 19 which is displaceable transversely over the foil web, and the transparent locations 7 are produced in a predetermined pattern in the layer composite structure 1.

Figure 2:
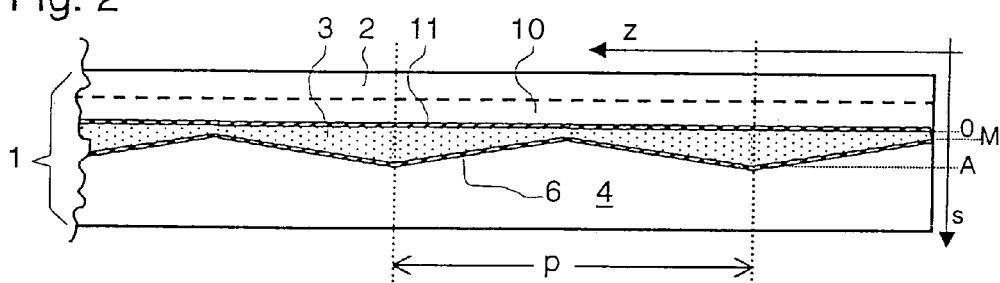
FIG. 2 shows a view in cross-section of another embodiment of the decorative foil.

In the embodiment of the decorative foil shown in FIG. 2 the layer composite structure 1 has the dielectric layer 3, the thickness s of which is modulated in the direction z at an angle $\theta$ (FIG. 4) with respect to the travel direction x (FIG. 4) of the decorative foil with a function F(z). The angle $\theta$ is of a value in the range of between 30° and 90°. The function F(z) is for example periodic, as shown in FIG. 2, in which respect a period p measured in the direction z is of the order of magnitude of between some centimeters and decimeters; preferably the length of the period p is selected from the range $1 \text{ cm} \leq p \leq 50 \text{ cm}$. That modulation is produced by irregular vapor deposition of the material for the dielectric layer 3. The function F(z) changes the values of the thickness s between a minimum value M and the maximum value A. For example the minimum value M is in the range $\leq 50$ nm while the range for the maximum value extends between 100 nm and 300 nm. The thickness s therefore varies very slowly over the surface area of the decorative foil. For the sawtooth function F(z) shown in the view in FIG. 2 the gradient of the thickness s is in the range of between 2 nm/cm and 250 nm/cm if the above-mentioned values are assumed to apply in respect of the minimum value M, the maximum value A and the period p. For other functions F(z) the thickness s varies between the minimum value M and the maximum value A at a maximum gradient in respect of the thickness s, which ranges in the same range as in the case of the periodic sawtooth modulation.

Since, as stated above, the color of the light 17 reflected by the decorative foil (FIG. 1) depends on the thickness s of the dielectric layer 3, the color of the reflected light 17 changes over the area of the layer composite structure 1 in accordance with the modulation of the thickness s, which is afforded by the function f(z). Such a layer composite structure 1 has a striking appearance, with and without optical-diffraction surface patterns in the base foil 2 and the lacquer layer 10 respectively. A particularly striking pattern is obtained if, after the application of a first dielectric layer 3 which is modulated in the direction (z), in a second installation a second dielectric consisting of the same or another material is deposited on that first layer, the thickness of application of the second dielectric being modulated for example transversely with respect to the direction z. In this example a net-shaped colored pattern appears in the reflected light 17 on the surface of the decorative foil.

Figure 3A:
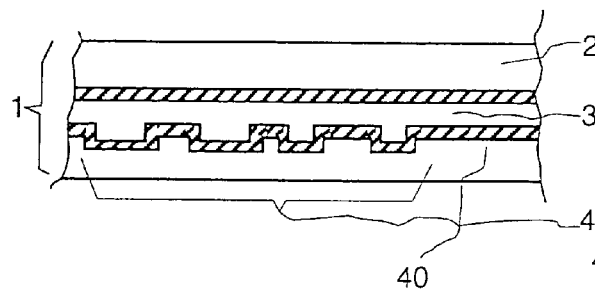
FIG. 3a shows a view in cross-section of a motif or subject in the decorative foil.

In an embodiment of the dielectric layer 3 shown in FIG. 3a the modulation is binary, that is to say the dielectric layer 3 has only two values in respect of the thickness s (FIG. 2). The thinner layer in the background surfaces 40 is of a value in respect of the thickness $s_{min}$ of less than 200 nm and the thicker layer in motif or subject surfaces 41 is of a value in respect of thickness $s_{max}$ in the range of between 100 nm and 300 nm, wherein the thickness $s_{max}$ is at least 25 nm thicker than the thickness $s_{min}$. In a special case the thickness smin=0; that is to say the dielectric layer 3 comprises the motif surfaces 41 which are not joined together and which are separated by the background surfaces 40 with or without a metallic layer 6. In an example a subject or motif comprising motif surfaces 41 and consisting of the same or another dielectric is so applied to the uniformly applied dielectric layer 3 that the dielectric layer 3 is of the thickness $s_{max}$ in the motif surfaces 41 of the motif and the thickness $s_{min}$ outside the motif surfaces 41. The thickness s of the dielectric layer 3 changes in accordance with the motif and is therefore modulated therewith. When the layer composite structure 1 is observed the motif is visible through the base foil 2. The motif surfaces 41 differ from the background surfaces 40 by virtue of a different interference color of the reflected light 17 (FIG. 1). Production of the motif surfaces 41 is advantageously effected by applying an additional layer of the dielectric, for example through a mask (not shown here), or by means of a per se known printing process, in which case preferably the above-mentioned transparent lacquer is applied in the motif surfaces 41, as far as the required thickness $s_{max}$.

If the motif surfaces 41 which are applied in succession in various layers with the same dielectric or with different dielectrics overlap, the arrangement of the motif surfaces 41 affords step modulation of the layer 3 comprising the dielectric or the dielectrics.

Figure 3B:
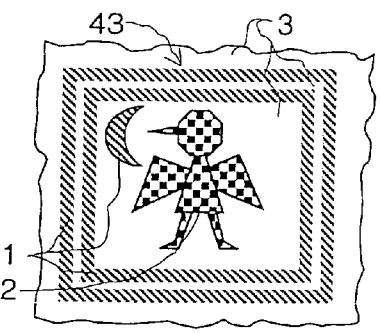
FIG. 3b shows the motif or subject as a plan view on to the decorative foil.

FIG. 3b is a plan view showing the structure of the dielectric layer 3, with the raised motif surfaces 41 being shown in rastered form in the drawing. The dimensions of the motif surfaces 41 which are shown in the drawing by means of a line raster are mostly greater than 0.3 mm, other than in the case of rastered images 42 whose motif surfaces 41 have a dot raster with a resolution of up to 400 dpi (=16 pixels/mm). If gray values of the images 42 are illustrated by the density of the dot raster, it is possible to use black-and-white portraits as an original for the images 42. The motif surfaces 41 and/or the images 42 form a pattern 43. Mention is to be made in this context of the ink jet printing process with which the motif surfaces 41 of the rastered images 42, texts and lines are transferred on to the dielectric layer 3 in accordance with an original stored in a computer in electronic form.

Reference is now again made to FIG. 1. As the layer 6 is practically no longer transparent by virtue of its layer thickness D the layer composite structure 1, in the surface portions with the metallic layers 6, covers the indicia or color areas 9 which are under the layer composite structure 1. In contrast thereto the layer composite structure 1 is transparent in the other surface portions where the transparent dielectric layer 3 directly adjoins the cover layer 4. The indicia 8 or color areas 9, or the surface 29 of the substrate 5, which are under the transparent decorative foil, are clearly visible insofar as visibility is not disturbed by the colored reflected light 17.

Figure 4:
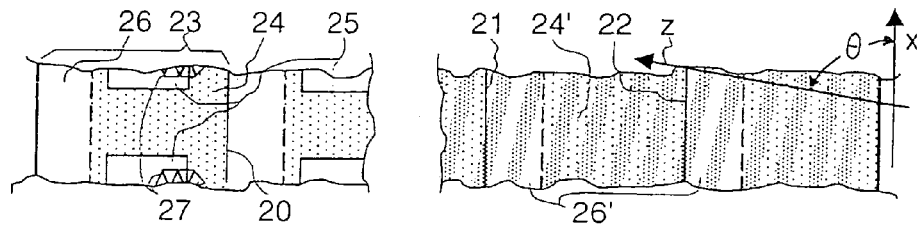
FIG. 4 shows plan views of configurations of the decorative foil.

FIG. 4 shows a portion from a foil web with the layer composite structure 1 which extends in the direction x. After application of the cover layer 4 (FIG. 2) and the optional pull-off foil the wide decorative foil is divided along the lines 20, 21, 22 into strips 23 of predetermined width and marketed.

The view in FIG. 4 shows on the left-hand side an embodiment of the decorative foil in which the dielectric layer 3 (FIG. 1) is of a thickness s (FIG. 1) which is as uniform as possible. In an embodiment of the strip 23 the dielectric layer 3 has the metallic layer 6 (FIG. 2) in a strip portion 24 at least at the second interface 14 (FIG. 1) while strip-shaped areas 26, 26' of the layer composite structure 1 are transparent. In the view in FIG. 4, in the strip 23, the strip portion 24, 24' which is emphasised by a coarse dot raster and the area 26, 26' are separated by a broken line. In an embodiment the strip portion 24 has window surfaces 25 at regular spacings in the metallic layer 6, the composite layer structure 1 being transparent in the window surfaces 25. In an advantageous embodiment, the microscopically fine relief of the above-mentioned surface pattern 27 is embossed in the region of the window surfaces 25 in order to enhance the level of counterfeiting security. The surface pattern 27 can also extend over into zones of the strip portion 24, which zones adjoin the window surfaces 25.

In another embodiment of the decorative foil which is shown on the right-hand side in FIG. 4, the dielectric layer 3 involves the periodic modulation in respect of thickness s in the indicated direction z. The strip pattern which appears colored differently in the reflected light is emphasised using graphic means in the view in FIG. 4 by means of strip-shaped surfaces which alternately have a dense raster and a coarse raster or no raster respectively. In the areas 26' between the line 21 or 22 and the most closely adjacent broken line dielectric layer 3 does not have any metal covering and the area 26' is transparent. The coarse raster in the strip 24' between the line 22 and the broken line to the left thereof symbolically represents the presence of the metallic layer 6 so that the composite layer structure 1 is opaque in the strip 24'.

In a further embodiment of the composite layer structure 1 the dielectric layer 3 is covered over its entire area at least with the metallic layer 6 so that the entire decorative foil is intensively colored but not transparent. Depending on the respective purpose of use involved the decorative foil is marketed in a condition of not being separated in respect of width or being divided into strips 23 of the most widely varying widths.

Figure 5:
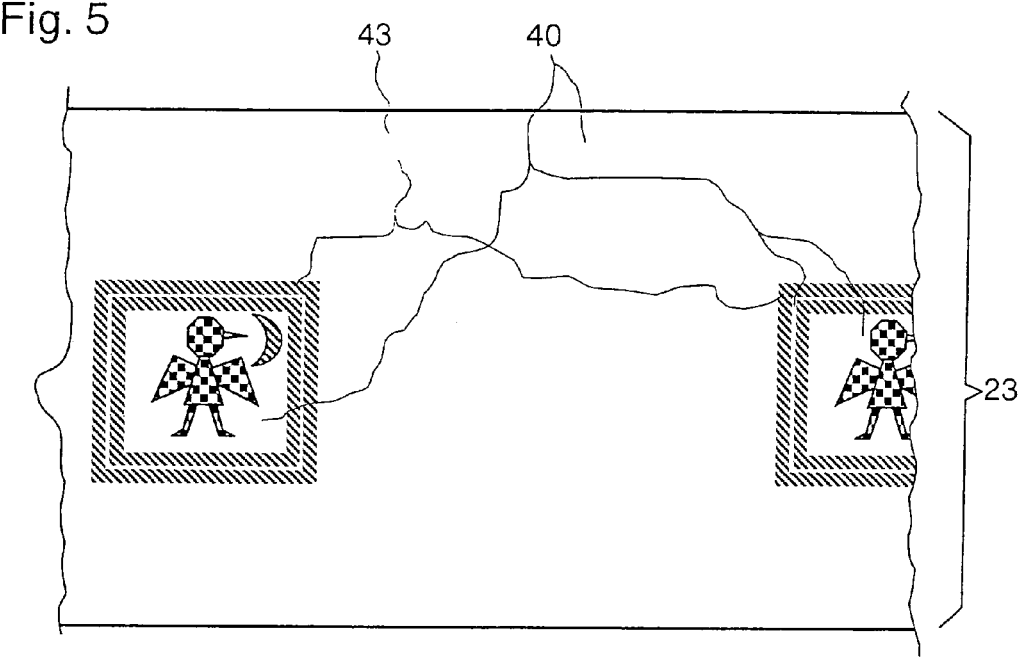
FIG. 5 shows a plan view of a decorative foil strip.

FIG. 5 shows a portion of the strip 23 viewing on to the base foil 2 (FIG. 3a). In the reflected light 17 (FIG. 1) the pattern 43 stands out from the interference color of the background surfaces 40 in and around the pattern 43 because of the modulation of the thickness s (FIG. 2) of the dielectric layer 3 (FIG. 3a), in a different interference color. The motif 43 shown in FIG. 3b is repeated for example at a regular spacing.

Figure 6:
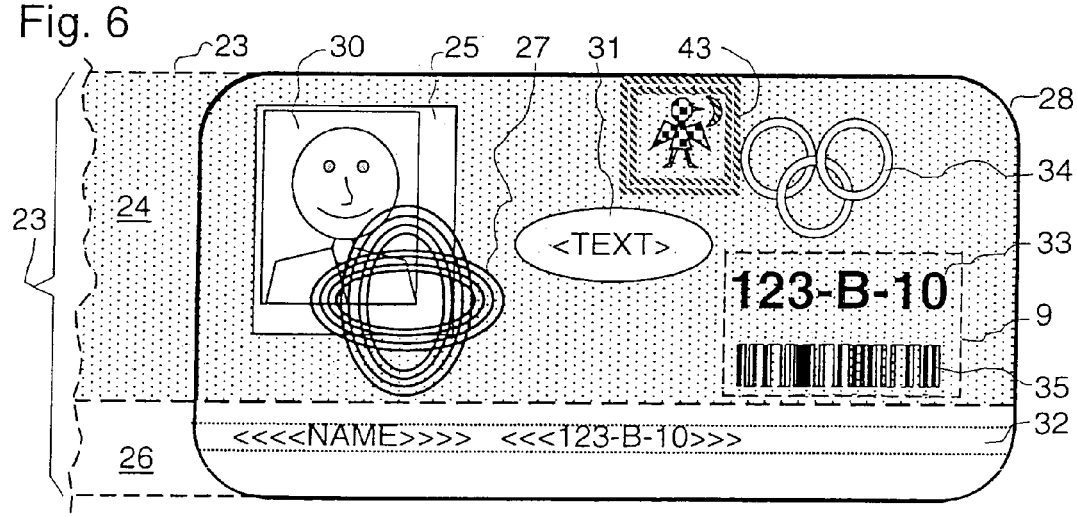
FIG. 6 shows a document laminated with the decorative foil.

FIG. 6 shows a use of the strip 23 illustrated in broken line, with the window surfaces 25, for sealing an identity card 28. The identity card 28 comprises the substrate 5 (FIG. 1) which, on its surface 29 (FIG. 1) to be protected with the lamination foil, has the color area 9 and the indicia 8 (FIG. 1) and an area for a photograph 30 of the holder of the identity card. The indicia 8 are general details about the card issuer in a text area 31. Upon delivery of the card the photograph 30 is stuck into the area provided for that purpose or is directly introduced on to the substrate and for example the name of the holder and his identity number, in this case '123-B-10' written into a labelling strip 32. In order to prevent subsequent alteration to the identity card 28 a portion of the lamination foil from the strip 23 is stuck on to the card in such a way that the photograph 30 is visible through the window surface 25 and the labelling strip 32 is visible through the area 26. The text area 31 and the color area 9 are covered by the opaque surface portions of the strip portion 24 of the lamination foil. After the glueing operation the identity card 28 is cut in such a way that there are no projecting remains left from the lamination foil.

Pieces of the lamination foil are also used for securing the individual details of a pass, a visa in a pass, banknotes, packaging etc. Hereinafter those uses are described by reference to the example of an 'identity card'.

The writing device 18 (FIG. 1) is displaced over the surface of the layer composite structure 1 to be written to, by means of a co-ordinate control system, in order to produce the transparent locations 7 (FIG. 1) in a predetermined raster pattern, in such a way that the indicia 8 under the lamination foil, for example in the text area 31 and, if no special window surface 25 is provided in the lamination foil, the photograph 30, are visible through the transparent locations of the layer composite structure 1.

Further individual items of information are advantageously also written by means of the energy beam 19 (FIG. 1) of the writing device 18 in the region of the reflecting strip portion 24 on the identity card 28 by virtue of the destruction of the metallic layer 6 (FIG. 1), such as for example alphanumeric characters 33, emblems 34, a bar code 35 or rastered images. Through the transparent locations 7 (FIG. 1), it is possible to see the color of the subjacent surface 29. The transparent locations 7 form a dot and/or line pattern which strikingly stands out in the invariable color of the surface 29 from the reflecting surface portions 36 (FIG. 1) of the layer composite structure 1. Instead of the dot and/or line pattern the transparent locations 7 also have shapes of the alphanumeric characters 33, the emblems 34 and the bar code 35 and are visible in the color of the surface 29. In the illustrated example the text 33 is the identification number '123-B-10' produced from the labelling strip portion 32 over the color area 9. In another embodiment the rectangular transparent locations 7 and the reflective surface portions 36 separating the transparent locations 7, of different width, form the bar code 35, in which case the rectangular transparent locations 7 represent bars and the reflective surface portions 36 represent separating spacings in the bar code 35. In the case of the banknote the serial number is the individual element which, after the lamination foil is stuck on, is to be written in, in visually coded form and/or machine-readably.

In another embodiment the writing device 18 is equipped with the apparatus known from above-mentioned WO 98/19869 and is capable of reading off an image original, breaking it down into small picture elements (=pixels) arranged in the raster, and producing transparent locations 7 in the form of a circular area in the layer composite structure 1 in the metallic layer 6 in the same raster in such a way that an image of the image original is produced in the layer composite structure 1. Gray values of the pixels are reproduced by differing diameters of the transparent circular areas. Degrees of resolution of up to 400 dpi (=16 pixels per mm) or more can be achieved.

By way of example the lamination foil additionally includes the optical-diffraction surface pattern 27 in the form of a guilloche pattern in the region of the window surface 25. As the window surface 25 with the guilloche pattern is never precisely placed on the area for the photograph, it is possible to recognise any exchange of the photograph 30 (in the context of an attempt at counterfeiting) by virtue of a break in the line configuration of the guilloche pattern. In addition in an embodiment the lamination foil has the pattern 43 produced by means of modulation of the thickness s (FIG. 2) of the dielectric layer 3 and/or the periodic modulation with a strip or net pattern.

Whether the decorative foils are later used as lamination foils or packaging foils, they can be written to, with the above-discussed patterns, on the above-mentioned rolling transfer installation. One use is for labelling a packaging foil with the logo or the trade mark of the product to be packaged.

Without departing from the idea of the invention, instead of the dielectric layer 3 (FIG. 1) comprising a single dielectric a dielectric layer 3 comprising a plurality of layers, as is known for example from U.S. Pat. No. 3,858,977, is also to be read into the foregoing description.

The invention claimed is:

1. A decorative foil with a layer composite structure comprising a transparent base foil, a transparent cover layer and a transparent dielectric layer arranged between the base foil and the cover layer, wherein a metallic layer is arranged between the dielectric layer and the cover layer in surface portions, wherein a transparent metal film is arranged between the dielectric layer and the base foil in regions corresponding to the surface portions of the metallic layer, and wherein a first interface in which the refractive index abruptly changes is provided between the dielectric layer and the base foil.

2. A decorative foil as set forth in claim 1, wherein the cover layer is adapted for gluing the layer composite structure onto a substrate.

3. A decorative foil as set forth in, claim 1 wherein the metal film comprises a metal selected from the group consisting of aluminum, silver, gold, chromium, copper and tellurium.

4. A decorative foil as set forth in claim 3, wherein the metal in the metal film has a transparency of at least 50%.

5. A decorative foil as set forth in claim 1, wherein the metallic layer comprises a metal selected from the group consisting of aluminum, silver, gold, chromium and tellurium.

6. A decorative foil as set forth in claim 5, wherein the metallic layer has a layer thickness in the range of from 50 nm to 300 nm.

7. A decorative foil as set forth in claim 1, wherein the layer composite structure further comprises a transparent thermoplastic lacquer layer between the first interface and the base foil.

8. A decorative foil as set forth in claim 1, wherein the dielectric layer comprises a transparent dielectric selected from the group consisting of $MgF_2$, ZnO, $TiO_2$, SiO, $SiO_2$, ZnS and a chalcogenide substance.

9. A decorative foil as set forth in claim 8, wherein the thickness of the dielectric layer is less than 300 nm.

10. A decorative foil as set forth in claim 1, wherein the thickness of the dielectric layer is a function of the location of changes over the surface of the layer composite structure and wherein the thickness of the dielectric layer has a gradient of between 2 nm/cm and 250 nm/cm.

11. A decorative foil as set forth in claim 9, wherein the thickness of the dielectric layer is modulated periodically at least in a direction over the surface of the layer composite structure.

12. A decorative foil as set forth in claim 1, wherein the dielectric layer in partial regions has a light diffracting, microscopically fine relief structure of a surface pattern at the first interface towards the base foil and/or at a second interface towards the cover layer.

13. A decorative foil as set forth in claim 1, wherein at least the metallic layer is perforated in a raster, in a dot and/or line pattern or in the form of alphanumeric characters and emblems, in such a way that the layer composite structure is transparent at said locations.

* * * * *